May 5, 1925.
S. A. ANDERSON, JR
1,536,553
ROLLER BEARING SLEEVE PULLER
Filed Jan. 27, 1923
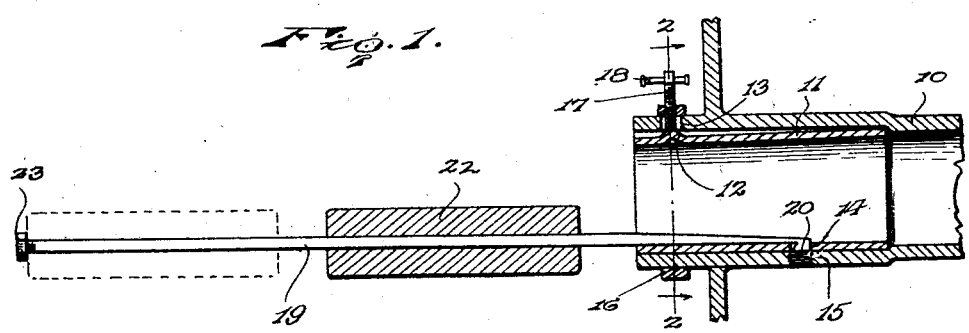
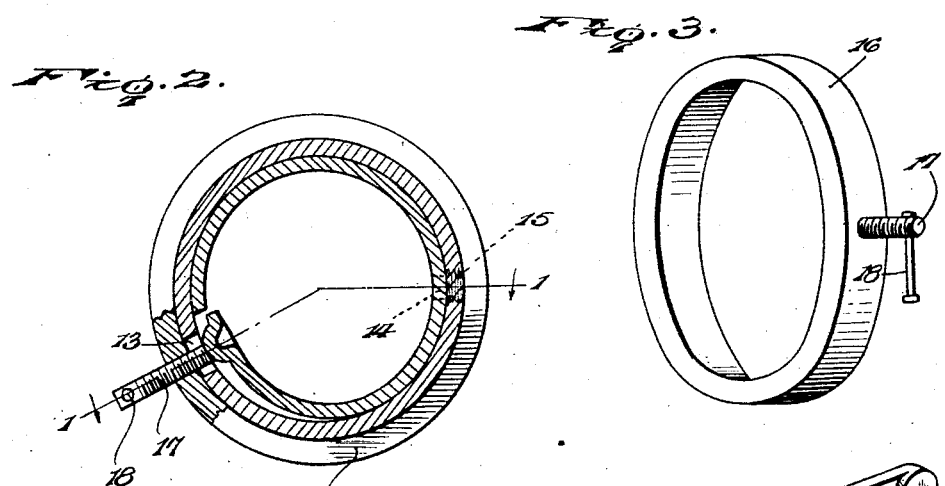
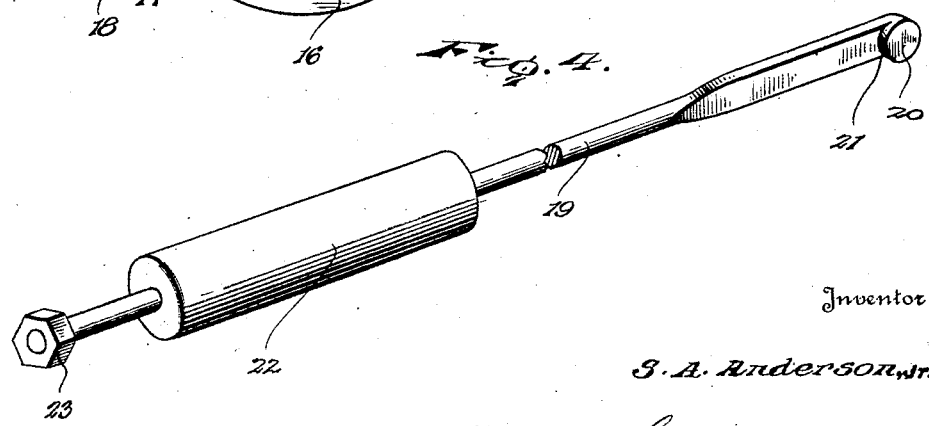
Inventor
S. A. Anderson, Jr.
By Lacey
Attorneys Patented May 5, 1925.

1,536,553

UNITED STATES PATENT OFFICE.

SNO A. ANDERSON, JR., OF WHIPPLE BARRACKS, ARIZONA, ASSIGNOR OF THREE-FOURTHS TO ENOCH C. SEALE, OF WHIPPLE BARRACKS, ARIZONA.

ROLLER-BEARING-SLEEVE PULLER.

Application filed January 27, 1923. Serial No. 615,269.

*To all whom it may concern:*

Be it known that I, Sno A. Anderson, Jr., citizen of the United States, residing at Whipple Barracks, in the county of Yavapai and State of Arizona, have invented certain new and useful Improvements in Roller-Bearing-Sleeve Pullers, of which the following is a specification.

This invention relates to an improved roller bearing sleeve puller for motor vehicles and seeks, as one of its principal objects, to provide a device whereby the roller bearing sleeve at either end of the rear axle housing of a vehicle may be easily and quickly removed without injury to the sleeve.

The invention has as a further object to provide a puller embodying means for releasing the sleeve from engagement with the housing and holding the sleeve so released in order that the sleeve may be freely removed.

And the invention has as a still further object to provide a puller which, while being adapted for general use, will be particularly suited for pulling the roller bearing sleeves from the rear axle housings of Ford vehicles.

Other and incidental objects will appear hereinafter.

In the drawings:

Figure 1 is a sectional view on the line 1—1 of Figure 2, looking in the direction of the arrows, showing my improved sleeve puller in use.

Figure 2 is a transverse sectional view on the line 2—2 of Figure 1, looking in the direction of the arrows.

Figure 3 is a perspective view showing the sleeve releasing ring of the device, and Figure 4 is a detail perspective view showing the sleeve removing tool of the device.

Referring now more particularly to the drawings, I have, for convenience, shown my improved device in connection with the rear axle housing 10 of a Ford vehicle. Removably fitting in the housing at its adjacent end is the usual longitudinally split roller bearing sleeve 11 on which is formed a knob 12 normally engaging in an opening 13 near the outer end of the housing locking the sleeve against outward displacement. The sleeve is further formed with an opening 14 registering with an opening 15 in the housing, the opening 15 being threaded to accommodate a grease cup normally engaged with the housing and the opening 14 being provided so that grease from the cup may enter the sleeve.

Coming now more particularly to the subject of the present invention, I employ a releasing ring 16 through which is threaded a radially disposed screw 17 equipped at its outer end with a handle pin 18. If preferred, an ordinary headed set screw may be employed in lieu of the screw shown. As illustrated in Figures 1 and 2, the ring is arranged to encircle the outer end of the housing 10 when the screw 17 is adjusted through the opening 13 in the housing to engage the knob 12 of the sleeve 11 for flexing the sleeve and depressing the knob inwardly out of the opening. The sleeve will thus be released and will be held so released by the screw.

In conjunction with the releasing ring, I employ a pulling tool comprising a shank 19 flattened at its forward end and provided at one side thereof with a disc shaped knob or hook 20, preferably undercut as indicated at 21. Slidable upon the shank is a sleeve 22 forming a tool handle and threaded upon the shank at its outer end is a nut 23 securing the handle against displacement. The handle is formed of metal to provide a hammer which, by sliding the handle along the shank, may be forcibly struck against the nut 23.

After the sleeve 11 has been freed, as previously described, and the grease cup has been removed from engagement in the opening 15 of the axle housing, the knob 20 of the pulling tool is engaged in the opening 14 of the sleeve, as shown in Figure 1 of the drawings, when by striking the handle 22 of the tool against the nut 23, the sleeve may be readily dislodged and pulled outwardly from within the housing. The knob 20 is undercut, as previously indicated, so that said knob will not readily slip out of the opening 14 in the sleeve during the pulling operation of the sleeve and it has been found, in actual practice, that the sleeve may be much more readily removed by employing a hammer upon the pulling tool so that the tool may be given a sharp blow, the force of which will tend to jerk the sleeve from within the axle housing, as contrasted with any device wherein a steady pull is exerted upon the sleeve.

Having thus described the invention, what is claimed as new is:

In a roller bearing sleeve pulling device, the combination of a unitary shank having a flat forward end portion provided at one side thereof with a terminal disc-shaped knob to fit in a circular opening in a bearing sleeve, the periphery of the knob being undercut at the rear side of the knob to coact with the rear portion of the wall of said opening for resisting dislodgment of the knob by the force of rearward impact upon the shank, a nut at the rear end of the shank, and a removable sleeve slidable upon the shank between the flat forward end portion thereof and said nut and movable to impact the nut for driving the shank rearwardly and removing the sleeve.

In testimony whereof I affix my signature.

SNO A. ANDERSON, Jr.  [L. S.]